United States Patent Office 3,578,722
Patented May 11, 1971

3,578,722
CHEMICAL PROCESS
Robert Neil Fraser, Horsham, England, assignor to BP Chemicals (U.K.) Limited, London, England
No Drawing. Filed Oct. 28, 1968, Ser. No. 771,271
Claims priority, application Great Britain, Nov. 16, 1967, 52,207/67
Int. Cl. C07c 3/50
U.S. Cl. 260—671
7 Claims

ABSTRACT OF THE DISCLOSURE

1:2:4:5 tetra-alkyl benzenes are produced from the reaction of propylene and xylene in mole ratio less than 2.

The invention relates to a chemical process and in particular to a process for the di-isopropylation of xylene to give products in which the substituents occupy the 1:2:4:5 positions.

Processes for the preparation of pure di-isopropyl xylene isomers from pure xylene isomers are known. Thus Kirkland et al. (J. Org. Chem. 1958, 23, 1631–1635) describes the alkalation of pure meta- and para-xylenes over a boron trifluoride/phosphoric acid catalyst to give 2:4-dimethyl-1:5 di-isopropyl benzene and 1:4-dimethyl-2:5 di-isopropyl benzene in selectivities of 83–92% and 50–60% respectively. The catalyst used in this reaction is expensive and loses its activity quickly.

By reaction of meta- or para-xylene with 2 moles of propylene under mild conditions in the presence of less than 0.75 mole percent of aluminium trichloride, di-isopropyl xylene fractions containing up to 70% 2:4-dimethyl-1:5 o-isopropyl benzene and 87.1% 1:4-dimethyl-2:5-di-isopropylbenzene respectively were obtained (see French patent specification No. 1,465,055 (Gelsenberg Benzin (AG)). The reaction is slow under these conditions e.g. as long as 15 to 17 hours is quoted. British patent specification No. 1,094,223 (Rutgertwerke) describes the alkylation of metaxylene with 2 moles of propylene in the presence of aluminium chloride and a phenol-formaldehyde resin to obtain di-isopropyl xylene fractions containing 87.5% of 2:4-dimethyl-1:5 di-isopropyl benzene, the impurities being isomers of various 1:2:3:5 configurations. The above processes all employ mole ratios of propylene:xylene corresponding to or in excess of the theoretical, i.e. 2. Moreover United States specification No. 3,345,426 (Esso) which describes a similar process to those described above recommends using excess of propylene.

It is an object of the present invention to provide a process for the di-isopropylation of xylene which is cheaper, more convenient and more selective than those employed hitherto with respect to the production of the 1:2:4:5 tetra-alkyl benzenes.

Accordingly the present invention is a process for the production of 1:2:4:5 tetra-alkyl benzenes which comprises reacting propylene and xylene in mole ratio propylene:xylene of less than 2 in the liquid phase at elevated temperature in the presence of aluminium chloride as catalyst.

Any mole ratio less than 2 may be used. However, as the ratio falls, more and more mono-isopropylxylene is formed which must be separated and recycled, thus adding to the cost of manufacture. The ratio should be between 1.4 and 1.9, preferably between 1.5 and 1.8 and most preferably between 1.6 and 1.7. It is surprising that by use of such mole ratios less than the theoretical the selectivity of the propylation of the xylene to produce 1:2:4:5 alkyl benzenes is greatly increased.

The process of the present invention is carried out at elevated temperature for example in the range 30° C. to 100° C. and preferably 40° C. to 70° C. The process may also be carried out under subatmospheric, atmospheric or superatmospheric pressure.

The xylene starting material may be the pure ortho- meta- or para-isomer or any mixture of two or three such isomers including industrially available mixtures provided that the ethyl benzene content of the latter is reduced to a low level e.g. below 5%. In general the di-isopropyl xylene fraction produced by reaction of a pure xylene isomer with propylene in accordance with the present invention will contain more than one of the possible isomeric forms of the 1:2:4:5 alkyl benzenes because some interchange of the relative positions of the methyl and isopropyl groups occurs.

The aluminium chloride catalyst is preferably activated before use by, e.g. with hydrogen chloride or isopropyl-chloride but may be used without activation. The amount of catalyst should be between 0.1 and 10 mole percent, preferably 0.5–5 mole percent, based on the total aromatic content of the feed.

The mono-isopropylxylenes formed may be recycled to alkylation, and when this is done the mole ratio of (fresh propylene+combined propylene in isopropylxylene) to fresh xylene should be maintained in accordance with the invention at less than 2.

The 1:2:4:5 alkyl benzenes prepared by the process according to the present invention find particular application in the preparation of pyromellitic di-anhydride by a process of oxidation. For this purpose it is not necessary to have a pure di-isopropylxylene isomer and any mixture of the three possible isomers may be employed. Pyromellitic di-anhydride itself is used as a cross-linking agent in alkyd resins and finds general application in polyamide resins.

The process of the present invention is described further with reference to the following examples:

EXAMPLE 1

Propylene (22.90 g.) was passed over a period of 48.5 minutes into pure m-xylene (42.98 g.) containing aluminium chluoride (1.08 g.) activated by treatment with 2-chloropropane (0.60 g.). The reaction mixture was maintained at 60° C. by external cooling. The molar ratio of propylene to xylene was 1.35:1.

The product was cooled, the catalyst was destroyed by washing with dilute aqueous hydrochloric acid. The organic layer was analysed and found to contain 54.5% monoisopropylxylenes and 45.5% di-isopropylxylenes. The latter fraction contained 72.8% of 1:3-dimethyl-4.6-di-isopropylbenzene, 20.2% of 1:4-dimethyl-2:5-di-isopropylbenzene, both of which are desirable isomers having the 1:2:4:5 configuration, together with 7% of other undesirable isomers.

EXAMPLE 2

Propylene (28.13 g.) was passed over a period of 45.7 minutes into pure m-xylene (42.73 g.) containing aluminium chloride (1.04 g.) activated by treatment with 2-chloropropane (0.60 g.). The reaction mixture was maintained at 60° C. by external cooling. The molar ratio of propylene to xylene was 1.66:1. The reaction product was worked up as in Example 1 and was found to contain 28.0% monoisopropylxylenes and 72.0% di-isopropyl-xylenes. The latter fraction contained 60.5% 1:3-dimethyl-4:6-di-isopropylbenzene, 30.2% 1:4-dimethyl-2:5-di-isopropylbenzene together with 9.3% of other undesirable isomers.

In comparison to the above two examples when a propylene to xylene molar ratio of 2:1 was used the di-isopropylxylene fraction contained 47.0% of 1:3-dimethyl-4:6-di-isopropylbenzene, 33.6% of 1:4-dimethyl- 2:5-di-isopropylbenzene and 19.4% of other undesirable isomers.

EXAMPLE 3

Propylene (27.87 g.) was passed over a period of 26.5 minutes into pure p-xylene (42.22 g.) containing aluminium chloride (1.05 g.) activated by treatment with 2-chloropropane (0.60 g.). The reaction mixture was maintained at 60° C. by external cooling. The molar ratio of propylene to xylene was 1.67:1. The reaction product was worked up as in Example 1 and was found to contain 22.9% mono-isopropylxylenes and 77.1% di-isopropylxylenes. The latter fraction contained 7.9% 1:3-dimethyl-4:6-di-isopropylbenzene, 85.9% 1:4-dimethyl-2:5-di-isopropylbenzene, together with 6.2% other undesirable isomers.

EXAMPLE 4

A synthetic mixture of xylene (42.51 g.) containing 87% of m-xylene and 13% p-xylene, corresponding to a commercially available mixture was treated with propylene (29.97 g.), aluminium chloride (1.07 g.) and 2-chloropropane (0.60 g.) over a period of 22.5 minutes at 60° C. The mole ratio of propylene to xylene was 1.78:1. The reaction mixture was worked up as in Example 1 and the product was shown to contain 15.6% mono-isopropylxylenes and 84.4% di-isopropylxylenes. The latter fraction consisted of 52.2% of 1:3-dimethyl-4:6-di-isopropylbenzene, 37.4% of 1:4-dimethyl-2:5-di-isopropylbenzene and 10.4% of undesirable isomers.

EXAMPLE 5

Propylene (501 g.) was passed over a period of 69.8 minutes into a synthetic mixture containing mono-isopropylxylenes (441.5 g.) and mixed xylenes (603.5 g., 87% m-xylene, 13% p-xylene) containing aluminium chloride (23.1 g.) activated with 2-chloropropane (13.2 g.). The reaction mixture was maintained at 60° C. by external cooling. The molar ratio of fresh propylene to fresh xylene was 2.10:1 and the overall molar ratio of propylene to xylene was 1.72:1. The reaction product was worked up as in Example 1 and was found to contain 24.1% mono-isopropylxylenes and 75.9% di-isopropylxylenes. The latter fraction consisted of 43.2% of 1:3-dimethyl - 4:6 - di-isopropylbenzene, 47.5% 1:4-dimethyl-2:5-di-isopropylbenzene and 9.3% of other undesirable isomers.

I claim:
1. A process for the production of 1:2:4:5 tetra-alkyl benzenes which comprises reacting propylene and xylene at a mole ratio of propylene to xylene within the range of 1.5 to 1.8 in the liquid phase at a temperature of 30° C. to 70° C. in the presence of a catalyst consisting of aluminum chloride, and wherein said aluminum chloride catalyst is activated before use by treatment with hydrogen chloride or isopropyl chloride.

2. A process as claimed in claim 1 wherein mono-isopropylxylene produced as a byproduct in the reaction is recycled to the alkylation reaction.

3. A process according to claim 1 wherein the mole ratio of propylene to xylene is within the range of about 1.6 to 1.7.

4. A process according to claim 1 wherein said xylene is selected from the group consisting of m-xylene, p-xylene and mixtures thereof.

5. A process according to claim 1 wherein said temperature is about 60° C.

6. A process according to claim 1 wherein said aluminum chloride catalyst is employed in an amount between 0.1 and 10 mole percent based on total aromatic content of feed.

7. A process according to claim 6 wherein said mole percent of aluminum chloride is between about 0.5 to 5 mole percent.

References Cited

UNITED STATES PATENTS

| 2,909,575 | 10/1959 | Saffer et al. | 260—671 |
| 3,337,647 | 8/1967 | Binder et al. | 260—671 |

FOREIGN PATENTS

| 1,465,055 | 11/1966 | France | 260—671 |

CURTIS R. DAVIS, Primary Examiner